US005883974A

United States Patent [19]
Fan et al.

[11] Patent Number: 5,883,974
[45] Date of Patent: Mar. 16, 1999

[54] METHODS FOR DETERMINING FONT ATTRIBUTES OF CHARACTERS

[75] Inventors: Zhigang Fan, Webster, N.Y.; Robert Cooperman, Middlesex County; Robert Shuchatowitz, Brighton, both of Mass.; Lucy Hadden, La Jolla, Calif.; Emil Rainero, Penfield; Frederick Roberts, Jr., Webster, both of N.Y.

[73] Assignee: Xerox Corporation, Stamford, Conn.

[21] Appl. No.: 843,051

[22] Filed: Apr. 11, 1997

Related U.S. Application Data

[62] Division of Ser. No. 369,440, Jan. 6, 1995, Pat. No. 5,668,891.

[51] Int. Cl.$^{6}$ .............................. G06K 9/46; G06K 9/00

[52] U.S. Cl. .............................. 382/203; 382/170; 382/286

[58] Field of Search .............................. 382/168, 170, 382/171, 173, 176–178, 190, 194, 198–203, 226–229, 325, 286, 290

[56] References Cited

U.S. PATENT DOCUMENTS

| | | | |
|---|---|---|---|
| 4,897,880 | 1/1990 | Wilber et al. | 382/177 |
| 5,048,113 | 9/1991 | Yamagata et al. | 382/310 |
| 5,159,645 | 10/1992 | Kumagai | 382/198 |
| 5,245,674 | 9/1993 | Cass et al. | 382/200 |
| 5,253,307 | 10/1993 | Wayner et al. | 382/181 |
| 5,278,920 | 1/1994 | Bernzott et al. | 382/176 |
| 5,321,768 | 6/1994 | Fenrich et al. | 382/178 |
| 5,359,673 | 10/1994 | Beaujardiere | 382/229 |
| 5,369,715 | 11/1994 | Tanaka et al. | 382/170 |
| 5,513,277 | 4/1996 | Huttenlocher | 382/171 |

*Primary Examiner*—Leo H. Boudreau
*Assistant Examiner*—Bhavesh Mehta
*Attorney, Agent, or Firm*—Oliff & Berridge, PLC

[57] ABSTRACT

Font attributes of characters or letters are estimated by an optical character recognition system using character, run or stroke-based techniques with or without character identification information.

13 Claims, 3 Drawing Sheets

FIG.8A
FIG.8B
FIG.8C
FIG.8D
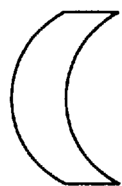
FIG.8E
FIG.8F
FIG.8G
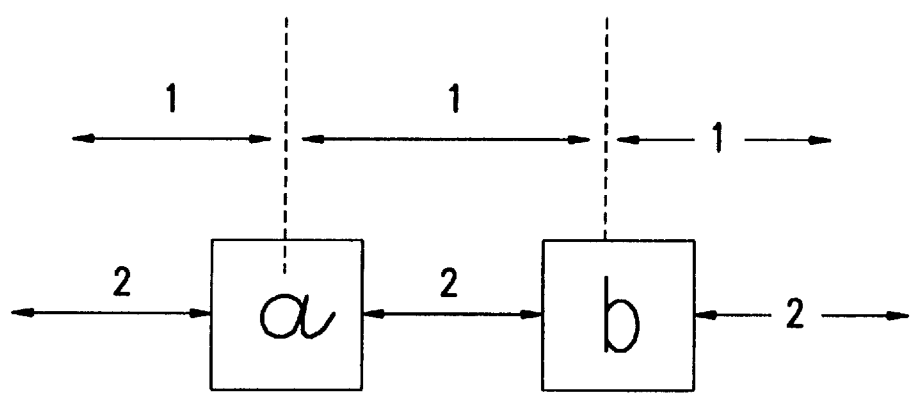
FIG.9

METHODS FOR DETERMINING FONT ATTRIBUTES OF CHARACTERS

This is a Division of application Ser. No. 08/369,440 filed Jan. 6, 1995, U.S. Pat. No. 5,668,891.

BACKGROUND OF THE INVENTION

1. Field of the Invention

The present invention relates to methods for improving the quality of images reproduced by Optical Character Recognition ("OCR") systems by determining the font attributes of characters with or without character identification information.

2. Discussion of Related Art Existing OCR systems have the capability of recognizing letters printed in different fonts with acceptable accuracy. Methods and apparatuses that duplicate letters and ensure that they are substantially similar when compared to originals normally require original font information concerning the most important font attributes to be available beforehand, i.e., before duplication. The most important font attributes include serifness (serif vs. san serif), posture (Roman vs. Italic), character x-height, ascender height, and stroke thickness.

SUMMARY OF THE INVENTION

It is an object of the invention to improve the output appearance of characters or letters reproduced by an optical character recognition system.

It is a further object of the invention to determine font attributes including character x-height, ascender height, stroke thickness, posture, serifness and proportion.

It is another object of the invention to determine original font attributes of characters with or without information regarding the original characters being available.

Thus, in accordance with one aspect of the present invention, the shortcomings of existing OCR systems are overcome by a method which estimates font attributes of a group of characters. The group is typically a word or a line of text. The use of a group of characters, instead of individual character improves the reliability of estimating font attributes. If only an individual character within a line of text or word were to be used, the estimates deduced may be inaccurate depending upon the character chosen for the estimate. This arises because some characters appear to change very little when a different font is used, making it difficult to determine one font from another using estimates derived from analysis of such characters.

In general, a character can be thought of as comprising a number of "bits". When shown in its "bit-mapped" form, a character's many bits are depicted. Such a bit-map may then be "run-length" encoded using methodologies similar to those disclosed in CCITT Recommendation 1.6., Facsimile Coding Schemes and Coding Control Functions for Group 4 Facsimile Apparatus (1984) incorporated herein by reference. Further, run-length encoded character information can then be used to determine a character's "strokes." Accordingly, "runs" are used in run-based embodiments of the present invention and "strokes" are used in stroke-based embodiments.

A character-based embodiment of the present invention comprises forming a histogram from heights of the characters and extracting x-height and ascender height from this histogram.

Font attributes may be estimated using character-based, run-based and/or stroke-based methodologies. A run-based embodiment of the present invention comprises forming "runs" from bitmaps of characters and estimating a stroke thickness and posture. The stroke thickness is obtained as the median of the run lengths. The posture is determined by analyzing histograms containing slant information extracted from the runs. A stroke-based embodiment comprises decomposing each character of the group of characters into strokes, classifying the strokes, estimating font information which includes stroke thickness, posture and serifness from the parameterized and classified strokes, storing the font information in histograms and analyzing them.

These and other aspects of the invention are described in the following detailed description of preferred embodiments of the invention.

BRIEF DESCRIPTION OF THE DRAWINGS

The preferred embodiments will be described with reference to the drawings, in which:

FIG. 8A depicts a stroke of a character classified as I-shaped;

FIG. 8B depicts a stroke of a character classified as V-shaped;

FIG. 8C depicts a stroke of a character classified as O-shaped;

FIG. 8D depicts a stroke of a character classified as X-shaped;

FIG. 8E depicts a stroke of a character classified as C-shaped;

FIG. 8F depicts a stroke of a character classified as CONCAVE;

FIG. 8G depicts a stroke of a character classified as CONVEX; and

FIG. 9 depicts characters whose bounding boxes and centers are separated by distances used in determining the proportion of a group of characters.

DETAILED DESCRIPTION OF PREFERRED EMBODIMENTS

Figure 1:
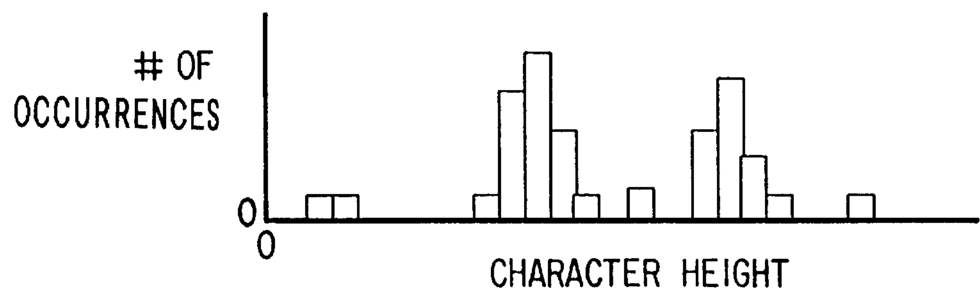
FIG. 1 depicts a histogram representing heights of a group of characters.
Figure 2:
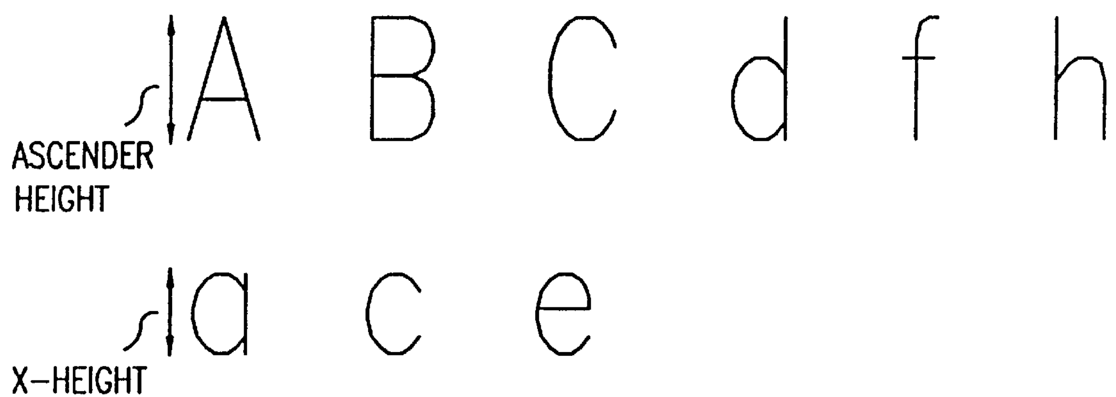
FIG. 2 depicts the character-based attributes of ascender height and x-height.

A first embodiment used to estimate font attributes will now be explained. FIG. 1 depicts an exemplary histogram used to estimate attributes using a character-based method or embodiment. Two attributes which can be estimated are known as "x-height" and "ascender height". As depicted in FIG. 2, x-height is the height from a lowest point of a type of character to a highest point of the character, the type of character in this instance belonging to a class comprising the lower case letters of the English alphabet, e.g., a, c, e . . . etc. Ascender height is also measured from the lowest point of a character to the highest point but, the character belongs to a class comprising all of the capitalized characters of the English alphabet and some lower case characters, e.g. A, B, C . . . d, f, h . . . etc. The histogram shown in FIG. 1 is built using statistical analyses for a group of characters comprising both types of characters, typically those characters within a word or a line of text.

Returning to FIG. 1, the histogram depicts the heights of characters in a selected group of characters and the number of characters having each height. Prior to plotting the heights of the characters to form the histogram, the height of each character is measured by the height of a character bounding box. Such a box is made from the smallest box capable of enclosing a bitmapped character. These values are then graphically illustrated as the histogram of FIG. 1. Typically, there are two peaks in such a histogram, one peak which corresponds to an x-height, indicated as "x" on the histogram of FIG. 1, and the other peak to an ascender height, indicated as "A" on the histogram of FIG. 1. Importantly, the separation (A-x) between these two peaks is usually greater than 0.2 times a measured x-height. The highest peak or mode of the histogram is defined as the entry with the maximum histogram value. The second peak is usually found at a position beyond the vicinity of the first peak, i.e. mode/1.2 or mode×1.2. The lower of the two character heights associated with the peaks is the estimated x-height while the higher character height is the estimated ascender scender height.

In addition to character-based methods, "run-based" methods can also be used to extract font attributes from a group of characters using another embodiment of the invention. The attributes extracted by a run-based method include stroke thickness and posture. Both stroke thickness and posture may also be determined by still other alternative methods, such as by a stroke-based method described later. Where it occurs, reference to run-based is used to differentiate from a stroke-based or character-based method.

Further, character-based, run-based and stroke-based methods are all used to build histograms from which font attributes can be determined. Once built, a histogram can be analyzed using numerous techniques mostly without regard to the method in which it was built.

Figure 3:
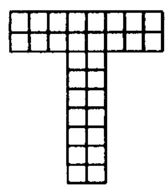
FIG. 3 depicts bitmaps of two characters.
Figure 3:
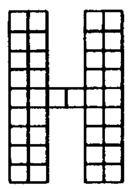

As shown in FIG. 3, a capital "T" and "H" are shown in bitmap form. Each bitmap is decomposed into "runs". Each run is specified by a set of rectilinear co-ordinates, e.g., y, x0, x1 (y coordinate, x starting co-ordinate, x ending co-ordinate).

Figure 4:
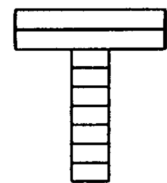
FIG. 4 depicts runs of the bit-mapped characters in FIG. 3.
Figure 4:
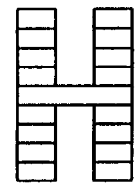

One character may be composed of many runs. FIG. 4 depicts exemplary runs for the letters "T" and "H" derived from the bitmaps in FIG. 3.

The stroke thickness of a character is estimated by putting the runs of a particular character into a particular order according to their run length. If "N" represents the total number of runs, the stroke thickness is estimated as the length of the $\frac{1}{2}N_{th}$ run or other representative run.

Figure 6:
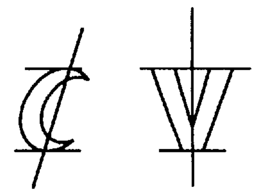
FIG. 6 depicts characters whose centers of top and bottom runs have been connected with a line to illustrate the slant of the characters.

The posture of a group of characters is estimated by first determining the slant of each character in the group. The slant is determined from the orientation of a line which connects the center of top runs of a character with the center of bottom runs of the character. FIG. 6 depicts two exemplary characters "C" and "V" where an illustrative line has been drawn connecting the centers of the top and bottom runs. The center of the top runs is located at a position $\frac{1}{2}(t_0+t_1)$ where $t_0=\min(x0(i))$ and $t_1=\max(x1(i))$ and x0 and x1 are starting and ending rectilinear coordinates of the "$i_{th}$" run. Minimums and maximums are calculated for each top run having a "y" coordinate value smaller than a preset number, e.g., 4.

Likewise, the center of bottom runs is calculated as $\frac{1}{2}(b_0+b_1)$ where $b_0=\min(x0(i))$ and $b_1=\max(x1(i))$. Minimums and maximums are calculated for all runs having a y coordinate value greater than a preset number, e.g., H-4 (where H is the height of the bounding box of the character, e.g., the bounding box around the letter "T" in FIG. 4).

Once the centers are known the line connecting each represents the slant of the character. This connecting line can be represented by the equation (1) x=by+c where the orientation parameter "b" represents the slant of the line. The value of "b" is then weighted by the height of the character and then stored in a histogram containing previously calculated slants of characters of the group. Once such values for all of the characters in a group are stored in a histogram the posture can then be determined.

Figure 7:
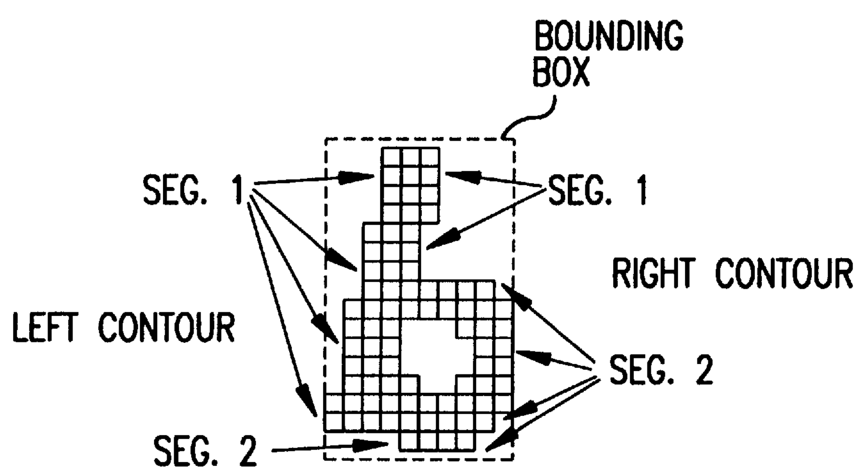
FIG. 7 depicts contours of a character.

The slant of each character can also be obtained using left and right contours or boundaries of a particular character. Each contour is represented by a set of rectilinear coordinates $(x_1, y_1; x_2, y_2 \ldots x_N, y_N)$ where $y_1$ is less than $y_2$, and $y_2$ is less than . . . $y_N$. Contours are segmented such that within a segment $y_{i+1}=y_i+1$ and $|x_{i+1}-x_i|$ is less than or equal to 1. FIG. 7 depicts contours of a character. The left contour or boundary is located at the pixel having the smallest x-coordinate of the bitmap, i.e., in FIG. 7 the x-coordinate of the pixel farthest to the left. The right contour or boundary is located at the x-coordinate or pixel of the bitmap having the highest x-coordinate, i.e., the pixel farthest to the right. Each segment of a character longer than a threshold, e.g., segment 1 in FIG. 7, can be represented by a parabola. The parabola is represented by the following equation:

$$x=ay^2+by+c. \qquad (2)$$

In equation (2) a, b and c are referred to as parameters. An orientation parameter, b, indicates the orientation or slant of the contour segment. As before, "b " values are weighted by segment lengths and then stored in a slant histogram.

Stroke thickness and slant, along with an additional attribute, serifness, can also be determined using a stroke-based embodiment of the present invention.

Figure 5:
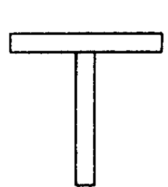
FIG. 5 depicts the strokes of the two run-length coded characters in FIG. 4.
Figure 5:
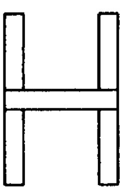

In such an embodiment, each character within a group of characters is comprised of strokes. For example, as shown in FIG. 5 a capital "T" is represented by two strokes, one in the horizontal direction and one in the vertical direction. Similarly, a capital "H" is represented by five strokes, four vertical and one horizontal.

Attributes are determined by first analyzing the respective strokes of each character. The strokes are then "parameterized" and classified. Font information from such classified strokes is then stored in different histograms. Finally, font attributes are obtained from the font information stored as modes of the different histograms. Each of these processes will now be described in more detail.

Strokes of one (or both) of the characters shown in FIG. 5 can be derived from the run-length encoded characters in FIG. 4. The beginning and end "connected runs" of a particular stroke, e.g., the beginning and end of the horizontal stroke in the letter "T" shown in FIG. 5, can be located using the corresponding connected runs shown in FIG. 4. Each stroke is composed of a number of connected runs which are single-connected and well aligned. More specifically, a run is declared as the beginning of a stroke if one of the following conditions is true: (1) the run does not have a top-connected run; (2) the run has more than one top connected run; (3) the run has only one top connected run and its top-connected run has multiple bottom-connected runs; or (4) the run is not well aligned with its only top-connected run, i.e., the horizontal rectilinear starting or ending coordinates of the run, compared to its only top connected run, differ by more than two pixels.

Similarly, a run can be declared as the end of a stroke if one of the following conditions is true: (1) the run does not have any bottom-connected runs; (2) a run has more than one bottom-connected run; (3) the run has only one bottom-connected run and its bottom-connected run has multiple top-connected runs; or (4) the run is not well aligned with its only bottom-connected run. i.e. the horizontal, rectilinear starting coordinates or ending coordinates of the run, compared to its only bottom connected run, differ by more than two pixels.

In such a manner, each character can be separated into strokes by using its corresponding, run-length encoded bitmap. To illustrate further, again referring to FIG. 4, there is shown an exemplary run length encoded character "T". The first (uppermost) run becomes the beginning of a stroke because it does not have any top-connected runs. The second run and the third run are not well aligned. Therefore, the second run is the end of the first stroke, and the third run is the beginning of the second stroke. Finally, the lowermost run is the end of the second stroke because it does not have any bottom-connected runs.

Once the strokes of a character are determined, the strokes are then parameterized; that is to say that their curvature, orientation and position are calculated, using two best fit parabolas and a least squares approximation method. These parabolas can be represented by:

$$x_0=a_0y^2+b_0y+c_0; \quad (3)$$

and $$x_1=a_1y^2+b_1y+c_1. \quad (4)$$

The curvature is represented by parameters $a_0$ and $a_1$, the orientation by parameters $b_0$ and $b_1$ and the position by $c_0$ and $c_1$, respectively.

All three sets of parameters are used to classify a particular character.

Some strokes can be eliminated from further analysis without having to first parametize them.

Two such strokes are known as FLAT and SHORT. A FLAT stroke occurs where h<0.5 w, where h and w are the height and width, respectively, of a stroke's bounding box. A SHORT stroke occurs where h<0.2 H, where H is the height of a corresponding character bounding box.

Parameters $a_0$, $a_1$ and $b_0$, $b_1$ are used to classify strokes into several classifications. FIG. 8A depicts an I-shaped stroke while FIG. 8B depicts a V-shaped stroke. If both $|a_0|$ and $|a_1|$ are very small the stroke is classified as either I-shaped or V-shaped. If $|b_0-b_1|$ is smaller than a threshold the stroke is classified as I-shaped. Otherwise the stroke is classified as V-shaped. FIG. 8C depicts an O-shaped stroke, FIG. 8D depicts an X-shaped stroke and FIG. 8E depicts a C-shaped stroke. Strokes are classified as O-shaped, X-shaped or C-shaped when both $|a_0|$ and $|a_1|$ are greater than a threshold and: $a_0>0$, $a_1<0$ for an O-shaped stroke; $a_0<0$, $a_1>0$ for an X-shaped stroke; and $a_0 \times a_1$ is>0 for a C-shaped stroke. A stroke can be further classified as CONCAVE (see FIG. 8F) or CONVEX (see FIG. 8H). When $|a_0|$ is small and $|a_1|$ is large and $a_1>0$ the stroke is classified as CONCAVE. If $a_1<0$ the stroke is classified as CONVEX. Similarly, in another embodiment, if $|a_1|$ is small and $|a_0|$ is large and $a_0>0$ the stroke is classified as CONVEX. If $a_0<0$ then the stroke is classified as CONCAVE.

The direction of a stroke is quantified based on its orientation. A stroke is quantified as HORIZONTAL when $$\frac{|b_0+b_1|}{2} > 1;$$

VERTICAL when $$\frac{|b_0-b_1|}{2} < 0.5;$$

or DIAGONAL otherwise.

Once each stroke is parameterized and classified, it is then possible to determine font information.

The first font related feature that can be determined is "stroke thickness". For each stroke classified as I-shaped, C-shaped, CONCAVE or CONVEX and whose direction is VERTICAL, its thickness is quantified by position parameters $|c_1-c_0|$, and is thereafter stored in the form of a stroke thickness histogram with a weighting proportional to h (the height of a stroke bounding box). Once this histogram is generated, a peak or mode of the histogram indicates the estimated stroke thickness.

"Slant" information of a character or of a group of characters can also be obtained by only considering information from strokes classified as I-shaped and whose directions are not HORIZONTAL. For each character so considered, a weighted average of $$\frac{|b_0+b_1|}{2}$$

is obtained. A slant histogram is built for the weighted averages of all the characters in the group.

At this point it is appropriate to discuss how the posture of a character or group of characters is derived from both slant histograms, i.e., one built using a "run-based" method and one built from a "stroke-based" method.

Using one embodiment the mode or peak of either histogram is first located. If the value of the peak, is higher than a preset "higher" threshold then the posture indicated is "italic". If the same peak is less than a preset "lower" threshold the posture indicated is "Roman".

A second embodiment first counts the values stored in the histogram which are greater than the higher threshold and the values that are smaller than the lower threshold. If the total number of counts related to both thresholds is below a set minimum then the posture of the character cannot be determined by the values stored in the histogram. In such a case the posture is usually determined using information from neighboring groups of characters where posture has already been determined. In such a case such information is weighted based on the distance, i.e. near or far, between the original group of characters and the neighboring group or groups of characters. In addition, the information is also weighted according to the attribute being estimated, in this case posture.

If more values are counted above the higher threshold than below the lower threshold the posture is "italic"; if less, "Roman".

An additional attribute which is used to determine the font of a group of characters is called serifness. Serifness is measured using the end widths of vertical strokes of a character which touch a top or bottom of a character, normalized with respect to a corresponding stroke thickness. For serif fonts, a typical end width/stroke thickness ratio is 1.5 to approximately 2.5 while for sans-serif fonts the ratio is about 1.

Serifness can be estimated using two different, yet related techniques. One embodiment of the present invention determines serifness by first finding a peak of a serifness/stroke histogram. Such a histogram is built using stroke thickness values which are related to serifness. If the value of the peak indicated from a serifness histogram is greater than 1.3×(stroke thickness) but less than 3×(stroke thickness) than the posture is identified as "serif".

On the other hand, if the peak has a value of less than 1.1×(stroke thickness) but greater than 0.75×(stroke thickness) then the posture is identified as "san serif".

A second embodiment counts the number of values (not just the peak) over two separate ranges, 0.75 to 1.1 (multiplied by a stroke thickness reference) and 1.3 to 3.0 (again, multiplied by a stroke thickness reference) of a histogram. If the number of values (each value represents the serifness of a character) which fall within both ranges is smaller than a threshold, the serifness is determined by using information from neighboring groups of characters where serifness has already been determined. As before, in such a case this information is weighted according to the attribute being estimated, i.e. serifness, and an appropriate distance. However, if the number exceeds the threshold and the number of counted values found in a first range of 0.75 to 1.1 is smaller than the counted values in a second range of 1.3 to 3.0 the serifness is classified as "serif". If it is greater, "san serif" is indicated.

It should be noted that the capability of estimating attributes using information from neighboring characters is not limited to posture and serifness.

As is apparent from the disclosure above, some font attributes such as stroke thickness and posture can be calculated in a number of different ways. Selection of one methodology over another will depend on computational costs, among other things.

Other font attributes may also be estimated using either character, run or stroke-based methodologies. For example, point size, "boldness" and "proportionality."

Referring to FIG. 9 two characters "a" and "b" are shown enclosed in their respective bounding boxes (shown in exaggerated form as a square around each character). The proportionality of a group of characters is determined by measuring the distances 2 between the bounding boxes of each character and determining whether such dispersion is less than a dispersion of distances 1 between the centers of each character. If so, the group of characters can be considered proportional.

Once the attribute for a group of characters is estimated it is then possible to place characters into "font groups". A font group is comprised of characters or groups of characters where each character or group has similar attributes. Font groups are created based on the assumption that there is a certain level of uniformity among the font attributes within a document. For instance, all the letters in a word are considered to be in the same font group even if their attributes differ.

Such differences typically cause little or no affect since it is assumed that certain of the font attributes may be incorrect, due to noise, etc. The font groups correct for this, by blending together the attributes found for a larger number of characters.

Each character in a font group is assigned identical font attributes, based on an averaging of the font characteristics discovered for all of its members.

For instance, if 45% of the characters in a font group were considered to be italic, 5% not italic, and 50% unknown, all would be assigned as italic. The requirement that entire words each be in the same font group can result in differing results. It is believed that these differing results are due to errors in the methods of detecting font attributes, and that font groups correct these errors.

Boldness is determined by determining a normalized stroke thickness for each font group in a document. Such a normalized stroke thickness is determined by dividing a stroke thickness by a font height. Those font groups with a significantly higher normalized stroke thickness than others in the same document are assigned as bold. All others are assigned as not bold.

The preceding description assumed that no character identification information was available. If such information is known this may dictate the methodology used to determine various font attributes. For example, for identifying the postures of letters "C" and "V" the run based method of connecting top and bottom runs is used, to determine the posture of the letter "b" the stroke based method is used. Similarly, histograms may not be needed to determine x- or ascender height. Such heights may be determined by computing the average heights (which are known) of the characters. As such, as will be realized by those skilled in the art, different methods can be used to determine the font of different letters, if character identification information, i.e., knowledge of the type of character but not its font, is available. Likewise, the methods can be combined or used individually. Histograms containing information determined by one or more methods can be built.

The invention has been described with reference to particular embodiments. Qualifications and alterations will occur to others upon reading and understanding the above specification. It is intended that all such modifications and alterations are included in so far as they come within the scope of the appended claims or equivalents thereof.

What is claimed is:

1. A method for estimating at least one run-based font attributable of a group of characters of an input image independently of any character identification information of the group of characters, comprising:

forming a plurality of single-connected and well-aligned-connected runs from bitmaps of the characters of the group of characters;

forming a slant histogram, the slant histogram comprising estimated slants of characters, from the plurality of runs of the group of characters;

identifying at least one frequency peak of the slant histogram; and estimating at least one run-based font attribute based on the plurality of runs and at least one of the at least one identified frequency peak.

2. The method of claim 1, wherein, for each character of the group of characters, the histogram forming step comprises:

determining a slant for each character of the group of characters from runs for that character of the plurality of runs;

forming at least one slant histogram from the determined slants for the group of characters.

3. The method of claim 2, wherein, for each character of the group of characters, the slant determining step comprises:

identifying at least one topmost run and at least one bottommost run;

determining a top center point of the at least one topmost run;

determining a bottom center point of the at least one bottommost run;

connecting the top and bottom center points to form a line;

determining a slant of the line.

4. The method of claim 1, further comprising estimating, for each character of the group of characters, a stroke thickness as the length of a representative run of the runs of that character.

5. The method of claim 1, wherein the run-based font attribute estimating step comprises determining a posture based on the at least one frequency peak of the slant histogram.

6. The method of claim 5, wherein the posture determining step comprises:

comparing a slant value of each of the at least one frequency peak of the slant histogram to a preset threshold;

determining if at least one of the at least one frequency peak is greater than the preset threshold; and when at least one of the at least one frequency peak is greater than the preset threshold, estimating that the group of characters has an italic posture.

7. The method of claim 5, wherein the posture determining step comprises:

comparing a slant value of each of the at least one frequency peak of the slant histogram to a preset threshold;

determining if at least one of the at least one frequency peak is less than the preset threshold; and when at least one of the at least one frequency peak is greater than the preset threshold, estimating that the group of characters has a Roman posture.

8. The method of claim 5, wherein the posture determining step comprises:

comparing a slant value of each of the at least one frequency peak of the slant histogram to a first preset threshold and a second preset threshold higher than the first preset threshold;

determining, for each at least one frequency peak, if the slant value for that frequency peak is less than the first preset threshold, between the first and second preset thresholds, or greater than the second preset threshold; and estimating that the posture for the group of characters based on the slant values of the at least one frequency peak which are less than the first preset threshold and greater than the second preset threshold.

9. The method of claim 8, wherein the posture estimating step comprises:

determining if a number of the slant values which are above the second preset threshold is greater than a number of the slant values which are below the first preset threshold; and when a number of the slant values which are above the second preset threshold is greater than a number of the slant values which are below the first preset threshold, estimating that the group of characters has an italic posture.

10. The method of claim 8, wherein the posture estimating step comprises:

determining if a number of the slant values which are above the second preset threshold is less than a number of the slant values which are below the first preset threshold; and when a number of the slant values which are above the second preset threshold is less than a number of the slant values which are below the first preset threshold, estimating that the group of characters has a Roman posture.

11. The method of claim 1, wherein the run-based font attribute estimating step comprises estimating the at least one run-based font attribute based on the at least one run-based font attributes estimated for at least one other group of characters located near the group of characters.

12. The method of claim 11, wherein the run-based font attribute estimating step further comprises weighting, for each at least one run-based font attribute of each at least one other group of characters, that run-based font attribute based on at least one of the font attribute and a distance between the group of characters and the corresponding other group of characters.

13. The method of claim 1, wherein the run-based font attribute estimating step comprises:

determining if character identification information is available; and when character identification information is available, estimating the character-based font attributes based on the plurality of identified frequency peaks and the available character identification information.

* * * * *